United States Patent [19]

Forney, Jr. et al.

[11] 3,978,407

[45] Aug. 31, 1976

[54] FAST START-UP ADAPTIVE EQUALIZER COMMUNICATION SYSTEM USING TWO DATA TRANSMISSION RATES

[75] Inventors: George D. Forney, Jr., Cambridge; James C. Hart, Medfield, both of Mass.

[73] Assignee: Codex Corporation, Newton, Mass.

[22] Filed: July 23, 1975

[21] Appl. No.: 598,244

[52] U.S. Cl. .............................. 325/42; 325/30; 328/162; 333/18; 340/146.1 AX
[51] Int. Cl.² ........................................ H04L 1/10
[58] Field of Search .................. 325/42, 65, 47, 30; 333/18; 340/146.1 AX; 328/162, 164

[56] References Cited
UNITED STATES PATENTS

| | | |
|---|---|---|
| 3,629,736 | 12/1971 | Hirsch et al. .................... 328/162 |
| 3,648,171 | 3/1972 | Hirsch ............................... 328/162 |
| 3,715,666 | 2/1973 | Mueller et al. ...................... 325/42 |
| 3,887,768 | 6/1975 | Forney, Jr. et al. .................. 325/30 |
| 3,935,535 | 1/1976 | Motley et al. ....................... 333/18 |

*Primary Examiner*—Glen R. Swann, III

[57] ABSTRACT

Initial Adjustment of a receiver having an automatic adaptive equalizer in a modem communication system is accomplished by employing a data transmission rate lower than normal for an early segment of each burst of signals. At this lower rate, accurate reception is possible without complete adaptation of the equalizer. These same (early segment) signals are used to adapt the equalizer in a decision-directed mode. When the adaptation is completed the system switches to its normal higher rate of data transmission.

10 Claims, 13 Drawing Figures

FIG 12

FAST START-UP ADAPTIVE EQUALIZER COMMUNICATION SYSTEM USING TWO DATA TRANSMISSION RATES

BACKGROUND OF THE INVENTION

This invention relates to high speed data communications modems, and is particularly useful in a multi-point system in which a central station communicates with a number of remote stations.

It is common practice to make initial adjustments in a modem receiver at the beginning of receipt of a signal burst, to adapt the receiver to the particular channel and transmitter from which it is to receive data. For this purpose each signal burst will typically include a preamble preceding the actual data to be communicated. The preamble represents overhead time that is wasted for data transmission purposes and should be minimized.

In current technology the length of the synchronization preamble is typically 10 msec or less for modems operating at 2400 bps or below, but is 50 msec or more for modems operating at 4800 bps or above. Modems operating at 2400 bps or below do not require an automatic adaptive equalizer in the receiver, whereas high-speed modems do, and the difference in the training times is approximately the time required to initially train the equalizer so that data transmission can begin.

In typical multi-point systems a large number of the return transmissions are relatively short, of the order of a few characters or a few dozen bits, usually simply reporting that the remote station has no data to send at that time. In such systems the data throughput may actually be higher with 2400 bps modems than with 4800, because of the former's shorter training time, even though long transmissions take nearly twice the time at 2400 bps.

SUMMARY OF THE INVENTION

The invention makes possible faster initial adjustment of receivers, reducing preamble overhead time. In particular, the invention provides for complete adjustment of a 4800 bps modem, including the equalizer, in essentially the time previously required to adjust a 2400 bps modem. For short messages the short setup time of a 2400 bps modem is obtained, while for long messages the high throughput of a 4800 bps modem is obtained, with a setup time shorter than that previously obtained at this speed. Thus, the best features of the high data rate and low data rate modems are combined.

The invention is applicable to receivers of the type adapted to receive bursts of signals sent at a predetermined rate of 1/T signals per second over a channel, wherein the receiver includes an automatic adaptive equalizer operative to facilitate accurate reception despite intersymbol interference when the signals each represent a predetermined number of data bits corresponding to a first selected high rate of data transmission. In general the invention features circuitry for enabling the receiver to process during an early segment of a burst signals each representing fewer than the predetermined number of data bits, corresponding to a second selected rate of data transmission lower than the first rate, at which second rate the receiver is capable of accurate reception without complete adaptation of the equalizer, circuitry for using signals in the segment to adapt the equalizer in a decision-directed mode, and circuitry for enabling the receiver to process the signals at the first rate of data transmission upon completion of the adaptation. In preferred embodiments the first rate is 4800 bps and the second rate is 2400 bps; the receiver includes timing recovery circuitry for periodically sampling the signals received by the receiver and supplying the samples to the equalizer, and initialization circuitry for processing preamble signals in the burst prior to the early segment to initialize the timing recovery circuitry to enable accurate reception of the data signals in the segment without complete adaptation of the equalizers; circuitry is provided for detecting the end of the preamble to initiate processing of the data signals at the second rate; the timing recovery circuit is adapted to cause the receiver to provide output signals at times $kT + \tau$, $k = 0, 1, \ldots$, where $\tau$ is a timing epoch, and the timing recovery initialization circuitry is adapted to process preamble signals consisting of signal points alternating between two values, the initialization circuitry comprising circuitry for determining the magnitude of the difference between the received signals and the signals delayed by T seconds, and circuitry for setting the initial value of $\tau$ in accordance with the time at which the magnitude reaches a maximum; the receiver is of the type adapted to receive signals sent by a QAM transmitter and therefore includes circuitry for processing complex signals each of which can be represented in the form $x(t) + iy(t)$, and the timing recovery initialization circuitry comprises circuitry for forming the differences $x(t) - x(t-T)$ and $y(t) - y(t-T)$, circuitry for computing the sum of the absolute magnitudes of the differences, and circuitry for monitoring the sum and providing an initialization pulse when the sum reaches a maximum; the receiver includes carrier recovery circuitry for setting the frequency and phase of demodulating carrier signals, the equalizer has complex tap coefficients and includes circuitry for processing complex preamble signals in the burst prior to the early segment and consisting of complex signal points alternating between two values whose average is non-zero, and carrier recovery initialization circuitry is provided for setting a single tap coefficient of the equalizer equal to a complex value whose phase is the difference between the phase of the average and the phase of the sum of the complex signal inputs to the equalizer at some time t plus the inputs at time $t + T$, and for setting all other tap coefficients to zero, whereby the average phase of the equalizer outputs will equal the average phase of the two values without initial adjustment of the phase generated by the carrier recovery circuitry.

Other advantages and features of the invention will be apparent from the description and drawings herein of a preferred embodiment thereof.

DESCRIPTION OF THE PREFERRED EMBODIMENT

Figure 1:
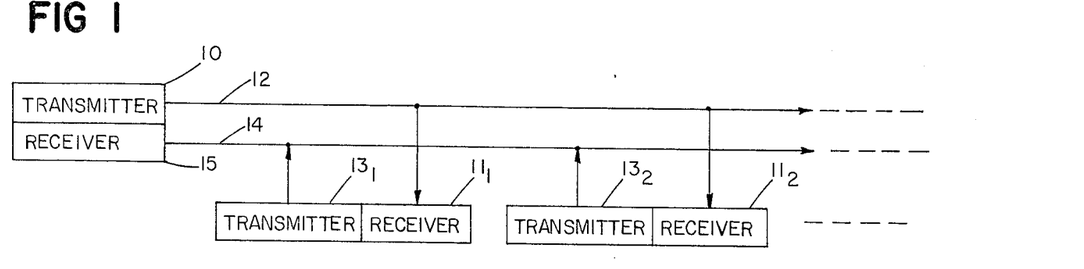
FIG. 1 is a block diagram of a multi-point data communications system.

FIG. 1 is a block diagram of a typical multi-point data transmission system. A single transmitter 10 at a central site broadcasts data and control information to a number of remote receivers $11_1, 11_2, \ldots$ on a common outbound line 12. In return, the remote transmitters $13_1, 13_2, \ldots$ transmit over a common return line 14 to the central site receiver 15. The remote transmitters are selected in turn by the central site transmitter to send non-overlapping bursts of signals.

Figure 2:
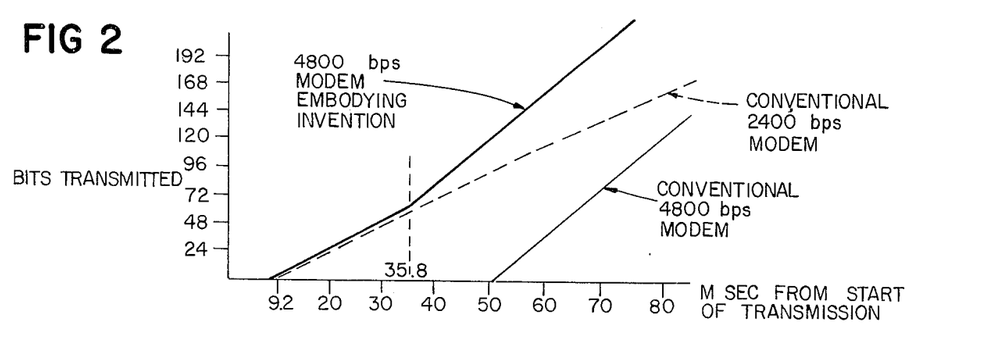
FIG. 2 is a graph illustrating the increased data capacity of a 4800 bps modem embodying the invention.

In a system embodying the invention the remote transmitter begins by sending a short preamble of length less than 10 msec to initialize the central site receiver, but not to train its automatic adaptive equalizer. It then commences sending data at a 2400 bps rate, which can be correctly received at the central site despite the lack of equalization. As the data are received, the receiver equalizer adapts itself in decision-directed mode to eliminate intersymbol interference. At a later predetermined time, less than 50 msec from the beginning of the preamble, the remote transmitter begins sending at the speed of 4800 bps and the central site receiver simultaneously shifts data rate to match, and the 4800 bps rate is maintained thereafter. Consequently short messages are received within approximately the same time as with a conventional 2400 bps modem, while long messages are received within less time than with a conventional 4800 bps modem. FIG. 2 illustrates the transmission time as a function of message length for a conventional 2400 bps modem, a conventional 4800 bps modem, and a 4800 bps modem embodying the invention.

A receiver capable of supporting a 4800 bps data rate is more complex than a conventional 2400 bps receiver and has more elements that must be initialized. In addition to the adaptive equalizer whose center tap must be properly adjusted to receive even unequalized data, a 4800 bps receiver contains an automatic gain control (AGC) circuit and a carrier recovery circuit to generate a local carrier signal for coherent demodulation, as distinguished from the differential demodulation typically used in 2400 bps modems. Finally, it is desirable to scramble the data to ensure spectral uniformity, and the receiver descrambler must be properly initialized before correct data reception can begin.

Figure 3:
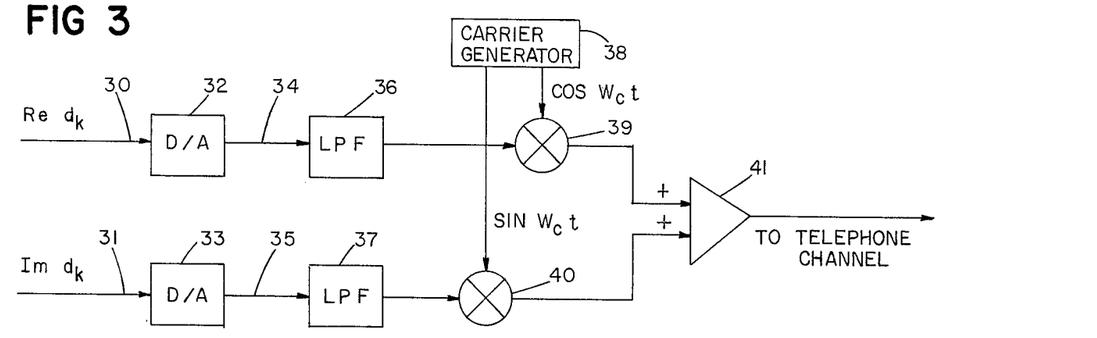
FIG. 3 is a block diagram of a QAM modulator.

FIG. 3 is a block diagram of a conventional QAM modulator. (The term QAM is used herein broadly to include all systems in which the transmitted signal can be represented as the superposition of two modulated signals, each being obtained by pulse-amplitude modulation of a signal sequence on a sinusoidal carrier, the two signal sequences being generated in synchronism at the same rate, and the two carriers being of the same frequency but 90° apart in phase. QAM thus includes a wide variety of double sideband systems, including pure phase modulation and combined amplitude and phase modulation.) The signal inputs 30 and 31 at any one time are a pair of numbers $Red_k$ and $Imd_k$ which are regarded as the real and imaginary parts of a complex number $d_k$.

The signals $d_k$ arrive in this application at a rate of $1/T = 1200$ signals/sec in digital form. The D/A converters 32 and 33 convert the digital signals $Red_0, Red_1, \ldots$ and $Imd_0, Imd_1, \ldots$ into two analog pulse trains 34 and 35, where the length of the pulse is 1/1200 sec, and its amplitude is equal to the corresponding signal $Red_k$ or $Imd_k$. These pulse trains are filtered in identical low-pass filters (LPFs) 36 and 37 to a bandwidth of approximately 600 Hz, and then are modulated by transmit carriers $cos\, W_c t$ (the in-phase carrier) and $sin\, W_c t$ (the quadrature carrier), respectively, where $W_c$ is the carrier frequency in rad/sec; a good choice for telephone channels is $W_c = 2\pi \times 1800$ rad/sec, or 1800 Hz. The carriers are generated in carrier generation circuit 38 and multiply the two filtered pulse trains in multipliers 39 and 40. The two modulated outputs are summed in adder 41 and transmitted over the telephone channel.

The signals $d_k$ are generated by the circuit of FIG. 4 as follows. Prior to the start of transmission, they are all zero, so that no transmitted signal is generated. At the start of transmission a preamble of 11 signals $d_k$, $0 \le k \le 10$, is generated by control logic 50 through coder 53 according to the pattern 01010101011, where a 0 denotes the complex number $2.5 + 2.5i$ and a 1 denotes $2.5 - 2.5i$, where $i = \sqrt{-1}$. This takes 11/1200 sec or 9.2 msec. Data transmission from source 49 then begins at a rate of 2400 bps. Input data bits 51 are passed through a scrambler 52, whose initial state is predetermined, at a rate of 2400 bps; the scrambler outpputs are taken two at a time through coder 53, resulting in the selection of one of the four data signals $\pm2.5 \pm2.5\, i$ (illustrated in FIG. 5a), which are sent out of the coder at 1200 signals/sec under the control of T clock signal 55. In this manner 64 data bits are coverted into 32 signals $d_k$, $11 \le k \le 42$, which takes another 3 2/1200 sec or 26.7 msec. At this point data transmission begins at a rate of 4800 bps; the input data bits are now accepted and passed through the scrambler at 4800 bps and are taken four at a time through the signal coder to select one of the 16 data signals illustrated in FIG. 5b, as more fully described in U.S. Pat. No. 3,887,768, issued to G. D. Forney and R. G. Gallager on June 3, 1975, the disclosure of which is hereby incorporated by reference. In this manner the remaining bits to be transmited are converted into signals $d_k$, $k \ge 43$, at a 4800 bps rate. The scaling of the initial 43 signal points to $\pm2.5 \pm2.5\, i$, an amplitude level comparable to the average amplitude of the subsequent signal points, ensures that there is not an abrupt transition in signal power when 4800 bps data begins.

Figure 4:
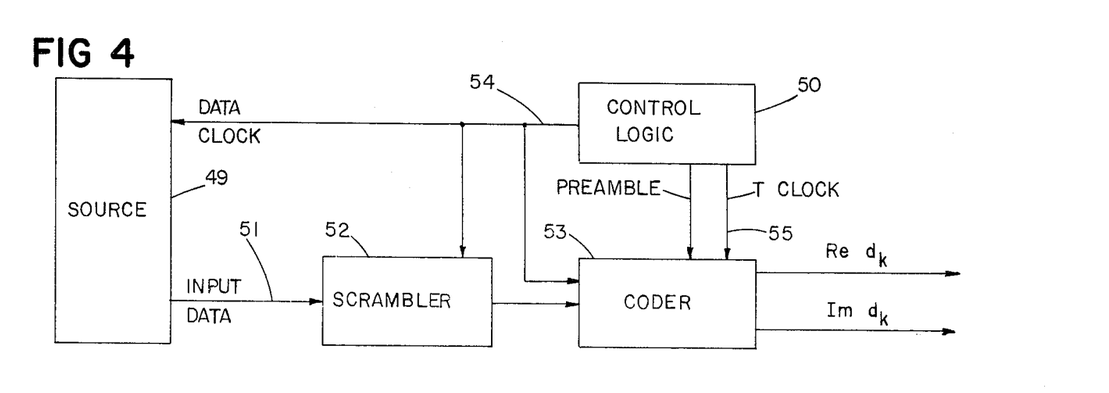
FIG. 4 is a block diagram illustrating the generation of data inputs to the modulator of FIG. 3.
Figure 5A:
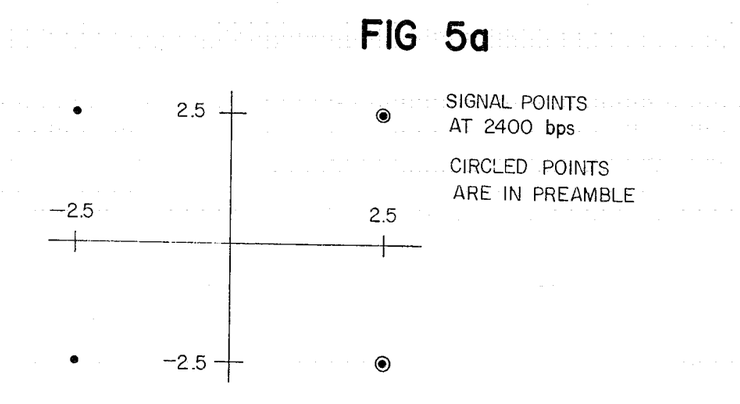
FIG. 5a is a graph illustrating signal points at 2400 bps, represented as points in the complex plane.
Figure 5B:
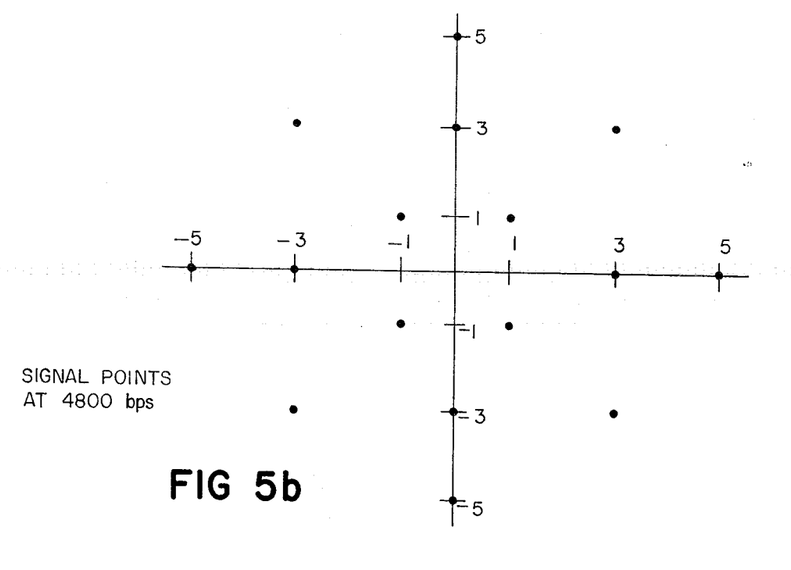
FIG. 5b is a diagram similar to FIG. 5a illustrating signal points at 4800 bps.

To fully use this invention, the data source must have the ability to provide data at the two rates of 2400 bps and 4800 bps as selected by the transmitter control logic 50 over data clock line 54 (FIG. 4). Most sources have this capability. However, even a source which must transmit at a fixed rate of 4800 bps can obtain some advantage from a receiver embodying this invention by refraining from transmitting data until the start of the 4800 bps mode, and putting an arbitrary 2400 bps input (such as all zeroes or ones) into the scrambler during 2400 bps mode. The total preamble length is then 43/1200 sec or 35.8 msec before 4800 bps transmission, which is still appreciably shorter than conventional 4800 bps training techniques have been able to achieve.

Figure 6:
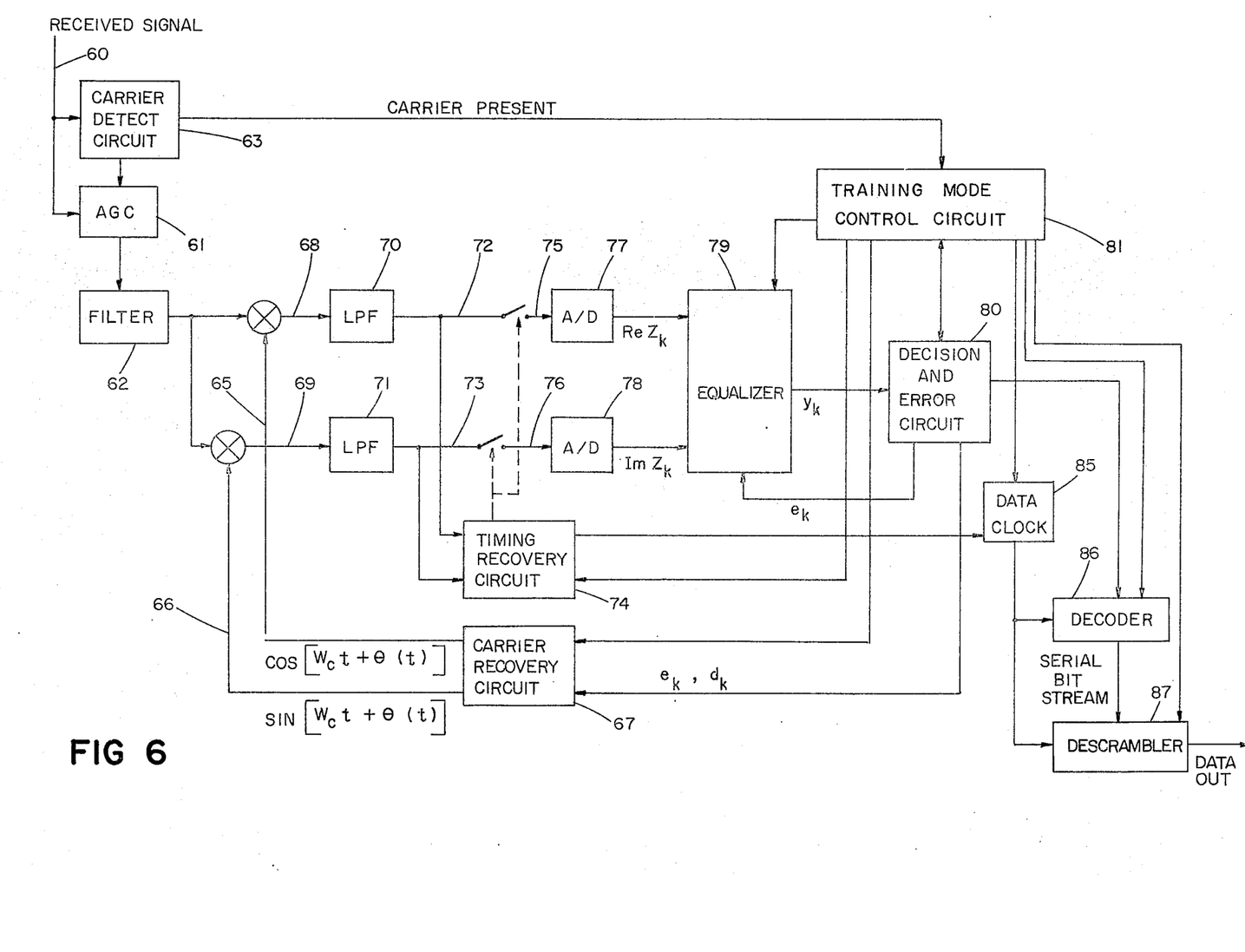
FIG. 6 is a block diagram of a receiver embodying the invention.

FIG. 6 is a block diagram of a QAM receiver suitable for use in this application. The received signal 60 is passed through an automatic gain control (AGC) circuit 61 that normalizes the received power, and a filter 62 that rejects out-of-band noise. A carrier detect circuit 63 monitors the received signal and puts out a "carrier present" logic signal when the power in the received signal exceeds a predetermined threshold level. The output of the AGC and filer is demodulated by both an in-phase local carrier 65, $\cos[W_c t + \theta(t)]$, and a quadrature local carrier 66, $\sin[W_c t + \theta(t)]$, which are generated by a carrier recovery circuit 67. Here $W_c$ is the nominal carrier frequency as definded above and $\theta(t)$ is the instantaneous phase of the carriers generated by the carrier recovery circuit. The in-phase and quadrature demodulated signals 68 and 69 are passed through identical low-pass filters (LPFs) 70 and 71 to remove unwanted second harmonic terms and provide some spectral shaping of the data signal. The filtered outputs 72 and 73 are sampled at intervals of T/2 sec, where T is the signalling interval of 1/1200 sec; that is, two samples are taken during each signalling interval. The sample timing is determined by a timing recovery circuit 74 whose inputs are filtered outputs 72 and 73. The sampled outputs 75 and 76 are digitized in A/D converters 77 and 78, and the two resulting digital numbers $ReZ_k$ and $ImZ_k$ are regarded as the real and imaginary parts of a complex signal value $$Z_k = ReZ_k + iImZ_k,$$

where $k$ is an index denoting the sampling time.

Figure 7:
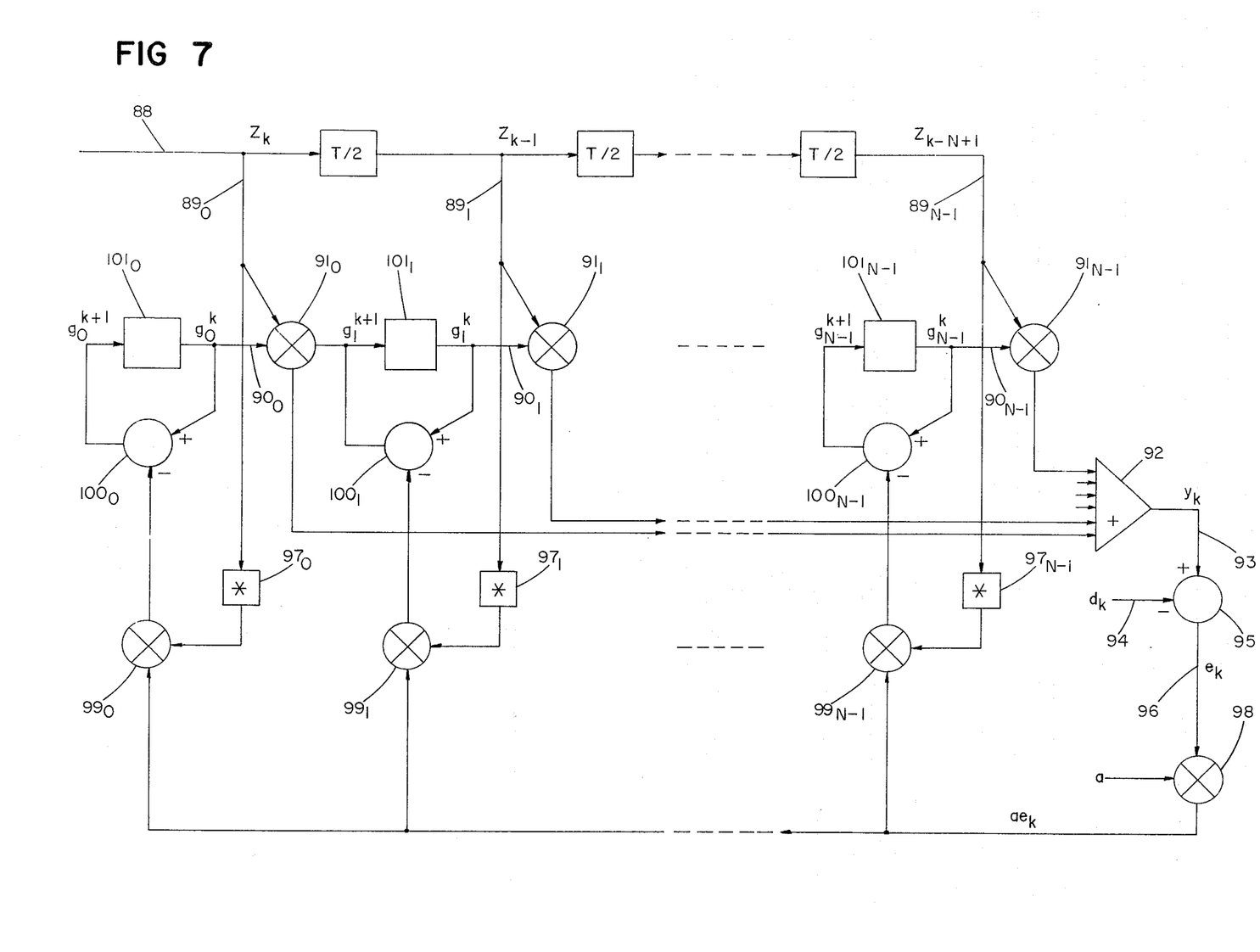
FIG. 7 is a diagram of an equalizer useful in the receiver of FIG. 6.

The complex numbers $Z_k$ then pass through a complex baseband equalizer 79 the details of which are shown in FIG. 7. The equalizer uses complex arithmetic to compute complex equalized output values $y_k$ according to the formula $$y_k = \sum_{j=0}^{N-1} g_j Z_{k-j} ,$$

where the N tap coefficients $g_j$, $0 \leq j \leq N-1$, are digital complex numbers that are stored in the equalizer and determine its characteristics. The computation is performed and the equalized outputs $y_k$ obtained only every T sec, i.e., for alternate (e.g., even-numbered) values of $k$. Finally, the equalized outputs $y_k$ are entered into a decision-and-error circuit 80 which in 2400 bps and 4800 bps modes decides which data signal $d_k$ must have been sent by the transmitter, and then computes the complex apparent error signal $e_k = y_k - d_k$.

Training mode control circuit 81 (described in further detail below) controls the modes of operation of the various receiver elements—AGC, carrier recovery, timing recovery, equalizer, decision-and-error circuit, data out clock, decoder, and descrambler—during the initial preamble through the 2400 bps and 4800 bps data modes.

The error signal $e_k$ is used to adjust the equalizer tap coefficients $g_j$ and the carrier recovery circuit phase $\theta(t)$. The decisions $d_k$ represent the transmitted data, which is converted back to a serial bit stream by a decoder circuit 86, which is the inverse of the coder circuit in the transmitter, and a descrambler circuit 87, which is the inverse of the scrambler. These circuits are clocked by a data clock 85, which is derived from timing recovery circuit 74, at 2400 bps or 4800 bps, according to the state of the training mode control, and data are clocked out at the corresponding rate.

A suitable adjustment algorithm for the equalizer is the so-called least-mean-squares (LMS) algorithm of Widrow and Hoff (1960 WESCON Convention Record, IRE, Pt. 4, pp. 96–104), as described in complex form by Proakis and Miller, IEEE Trans. Inf. Theo., Vol. IT-15, No. 4, 1969. The procedure is illustrated in FIG. 7, which is a schematic representation of a complex equalizer with taps spaced T/2 seconds apart. The equalizer inputs 88, a sequence of complex numbers $Z_k$ representing the LPF outputs sampled T/2 seconds apart, are available at the taps $89_0$, $89_1$..., $89_{N-1}$ with delays of 0, T/2..., (N−1) T/2 seconds respectively. At times $kT + \tau$, $k = 0, 1...$ the tap outputs are multiplied by the complex tap coefficients $90_0$, $90_1$..., $90_{N-1}$ in complex multipliers $91_0$, $91_1$..., $91_{N-1}$ and the outputs are summed in the complex adder 92 to form the complex equalized output 93($y_k$). The complex transmitted signal 94($d_k$) (which is known during the preamble) is subtracted from 93 in complex subtractor 95 to form a complex error signal 96($e_k$). Each tap coefficient $g_j^k$ is then adjusted to a new value $g_j^{k+1}$ according to error signal $e_k$ and the tap values $Z_{k-j}$, $0 \leq j \leq N-1$, by the following rule:

$$g_j^{k+1} = g_j^k - ae_k Z^*_{k-j},$$

where $a$ is a small real constant and $Z^*_{k-j}$ is the complex conjugate of $Z_{k-j}$. The rule is implemented by complex conjugators $97_0$, $97_1$..., $97_{N-1}$, complex multiplier 98, complex multipliers $99_0$, $99_1$..., $99_{N-1}$, complex subtractors $100_0$, $100_1$..., $100_{N-1}$, and complex registers $101_0$, $101_1$..., $101_{N-1}$ storing the tap coefficients.

To understand how the various elements of this receiver may be initialized, it is helpful to consider what the behavior of the in-phase and quadrature filtered outputs 72 and 73 would be if:

1. the transmitter inputs $d_k$ alternated indefinitely between 2.5+2.5i and 2.5−2.5i;
2. the AGC were set to the proper level; and
3. the demodulating carrier had the proper phase.

Figure 8:
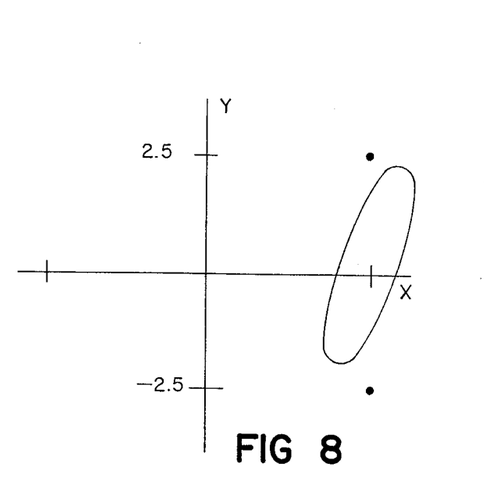
FIG. 8 is a graph illustrating the elliptical trajectory of the in-phase and quadrature low-pass filter outputs corresponding to preamble signals, with proper local carrier phase.

We can assume that intersymbol interference is relatively small, since in the signal bandwidth of 1200 Hz to 2400 Hz most telephone channels introduce little distortion (this is why 2400 bps modems do not need adaptive equalizers). This means that at the "correct" sampling times, T sec apart, the in-phase and quadrature filtered outputs 72 and 73, which for the moment we shall denote by (x,y), must be alternately near (2.5,2.5) and near (2.5,−2.5). In fact, analysis shows that the trajectory of (x,y) as a two-dimensional vector describes an ellipse, as illustrated in FIG. 8, with the extreme points near (2.5,2.5) and (2.5,−2.5), respectively. (The exact shape of the ellipse depends on the channel transmission characteristics at 1200 Hz and 2400 Hz relative to those at the carrier frequency of 1800 Hz). It takes 2T sec for the filtered outputs (x,y) to complete a cycle of the ellipse and the "correct" sampling times are at the extremes, T sec apart.

Figure 9:
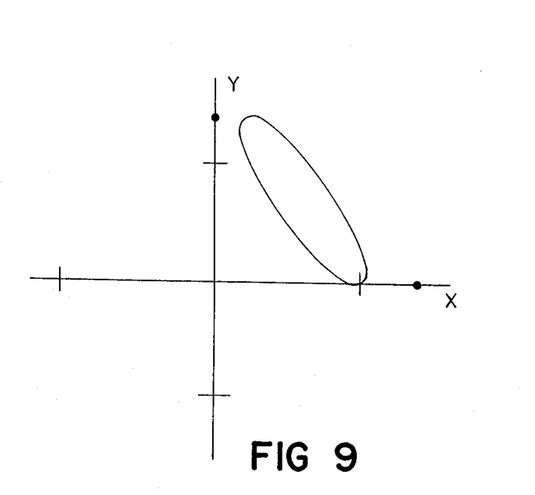
FIG. 9 is similar to FIG. 8, but includes a local carrier phase error of 45°.

The actual initialization procedure is as follows: When the carrier detect circuit first indicates "carrier present", the AGC is put into a high-gain mode in which it adapts to approximately its proper level within a few msec. The carrier recovery circuit starts up with an arbitrary phase. Within a few msec the filtered outputs then settle down to an ellipse like that in FIG. 8, except rotated by an arbitrary phase $\theta$, as shown in FIG. 9. Mathematically, if $x$ and $y$ are regarded as the real and imaginary parts of a complex number $z$, $$z = x + iy,$$

then the effect of arbitrary carrier phase $\theta$ is to multiply $z$ by the unit-magnitude complex number $e^{i\theta}$. After a few msec (5 signalling intervals T prove to work in practice), the AGC returns to normal mode and the timing recovery circuit then initializes itself as follows. Let $z(t)$ represent the complex number $x + iy$ at some time $t$ and $z(t-T)$ the same quantity one signalling interval T earlier. The timing recovery circuit simply computes the quantity $m(t) = |z(t) - z(t-T)|$, where $|.|$ indicates complex magnitude, and when $m(t)$ reaches a maximum, as will happen every T sec, it calls that the "correct" sampling time and accordingly sets the initial value of the sampling epoch; samples are then taken every T/2 seconds thereafter.

Figure 10:
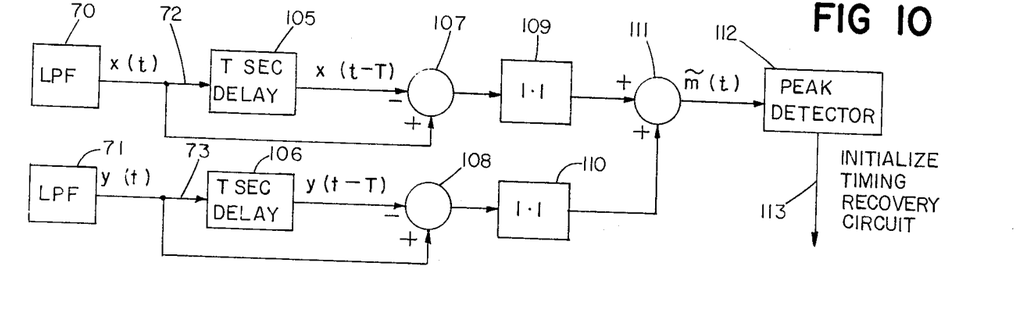
FIG. 10 is a diagram of circuitry useful for initializing the timing recovery circuit of FIG. 6.

A suitable implementation of the above is illustrated in FIG. 10. The in phase and quadrature filtered signals $x(t)$ 72 and $y(t)$ 73 are each delayed by T sec in delay lines 105 and 106 to give $x(t-T)$ and $y(t-T)$, and the differences $x(t) - x(t-T)$ and $y(t) - y(t-T)$ are formed in subtractors 107 and 108 to give the real and imaginary parts of $z(t) - z(t-T)$. We then approximate the magnitude $m(t)$ of this complex number by the sum $\tilde{m}(t)$ of the magnitudes of its real and imaginary parts, which is obtained by adding the outputs of absolute magnitude circuits (full-wave rectifiers) 109 and 110 in adder 111. A peak detector 112 then fires when $\tilde{m}(t)$ reaches a maximum, and the pulse 113 which occurs at this instant is used to initialize the timing recovery circuit. The circuit can also be realized in sampled and digital form by sampling $x(t)$ and $y(t)$ at a sufficiently high frequency and performing all subsequent operations digitally.

To correct for the arbitrary phase rotation $\theta$, one tap coefficient of the equalizer is set up as follows. (This could be the center tap coefficient, or one in any other predetermined desired position.) We observe in FIG. 8 that any two points on the ellipse trajectory separated by T seconds, say $Z(t)$ and $Z(t+T)$, will be approximately symmetrically located about the point $(x,y) = (2.5,0)$. In other words $$\frac{|Z(t) + Z(t+T)|}{2} \approx 2.5$$

independent of the time t, where $\approx$ indicates approximate equality. It follows that in FIG. 9, after a rotation of $\theta$, we have $$\frac{|Z(t) + Z(t+T)|}{2} \approx 2.5 e^{i\theta}$$

independent of t. (In general, the average phase of the equalizer inputs Z will be equal to the average phase of the input signals (here 0°) plus the received carrier phase offset $\theta$). This observation motivates the following rule: let the complex number we be computed as the sum of any four consecutive samples of Z, i.e., for some $t$, $w = Z(t) + Z(t+T/2) + z(t+T) + Z(t+3T/2)$. Then set one tap coefficient of the equalizer, say $g_M$, to $w^*/10$, where $w^*$ is the complex conjugate of $w$, and set all other tap coefficients to zero. The rationale is that, from the observation above, $w \approx 10e^{i\theta}$, so $g_M \approx e^{-i\theta}$. Then the equalizer output $y_k \approx e^{-i\theta} Z_{k-M}$; i.e., the equalizer outputs are equal to the inputs delayed by MT/2 seconds and counter-rotated by $-\theta$ degrees. Therefore the equalizer outputs at the correct sampling times will be alternately approximately (2.5,2.5) and (2.5,−2.5), which were the original transmitted inputs.

We see that there is a delay of MT/2 seconds between the time the timing recovery circuit is initialized and the time that the equalized outputs correctly represent the transmitted inputs. This period also represents the main delay through the receiver. For these reasons M should not be too large; we have found that an equalizer with $N = 8$ tap coefficients and $M = 4$ works well on a wide range of channels. A small N also facilitates equalizer convergence. This is also the reason why an equalizer with tap spacing of T/2 is preferable to a conventional equalizer with tap spacing of T.

Another method of setting up the main tap coefficient of the equalizer employs the circuitry available for regular equalizer adjustment. For four consecutive samples, T/2 seconds apart, the training mode control circuit 81 (FIG. 6) causes the decision-and-error circuit 80 to force the complex error signal $e_k$, $k = 0, 1, 2, 3$, to a negative real constant c. Simultaneously, a single tap coefficient, $g_M$, is updated using the least-mean-squares algorithm as follows:

$$g_M^{k+1} = g_M^k - ac_k Z^*_{k-M}$$

$k=0, 1, 2, 3$, where $Z^*_{k-M}$ is the complex conjugate of the tap value corresponding to $g_M$ at instant kT/2. Thus, at the end of four adjustments we obtain $$g_M(2T) = -ac[Z(t) + Z(t+T/2) + Z(t+T) + Z(t+3T/2)] = -acw^*$$

Choice of the constants a and c so that $ac \approx -1/10$ yield $g_M^{(2T)} \approx e^{-i\theta}$, as before.

Figure 11:
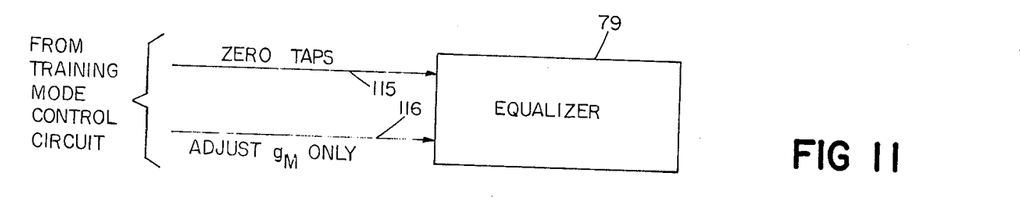
FIG. 11 is a diagram illustrating initial set up of one tap of the equalizer of FIG. 6.

Implementation of this procedure is shown in FIG. 11. The training mode control circuit 81 intervenes in the normal operation of the equalizer with LMS adjustment algorithm (as shown in FIG. 7) via two control lines 115 and 116. Control line 115 is made active at the beginning of training and holds all equalizer tap coefficients to zero. After a predetermined time from the start of training, which we have chosen to be 5 signalling intervals T, control line 115 is turned off and control line 116 becomes active for four samples (an interval of 2T). Control line 116 causes all tap coefficients except $g_M$ (here $M=4$) to remain at zero and $g_M$ to be adjusted with a value of $a = 1/4$ and $e_k = c = -½$, so that $-ac \approx 1/10$. (The fact that $g_M$ may not be of precisely the correct amplitude is of no consequence during the preamble and 2400 bps data since the modulation and decisions depend only on phase during these periods.) After four samples control line 116 becomes inactive and the equalizer returns to its normal decision-directed mode in which all tap coefficients are updated according to the error signal $e_k = y_k - d_k$, where $d_k$ is the receiver decision.

Once the above operations are carried out and the equalizer outputs correctly represent the transmitted inputs, the decision-and-error circuit begins to monitor the equalized outputs. Since there may be a variation of several signalling intervals T in the time required for the carrier detect circuit to fire on different channels, this monitoring may start anywhere in the latter part of the 11-signal preamble. When the decision-and-error circuit observes two consecutive equalized outputs equal to (2.5,−2.5), however, it knowns that the second one is the last one of the preamble, and therefore that the next signal is the first 2400 bps data signal. It thus initializes the descrambler and initiates 2400 bps reception, followed 32T seconds later by a transition to 4800 bps reception.

Training of the equalizer taps can commence as soon as valid equalized outputs start appearing, as described in the previous paragraph; i.e., during the latter part of the preamble and throughout the 2400 bps and 4800 bps data modes. It is desirable not to initiate adjustment of the carrier recovery circuit until some time (e.g., 8 signalling intervals) into the 2400 bps mode to avoid interference with the equalization process. It is also desirable to begin equalizer training with a relatively large value of the adjustment constant $a$ for fast initial coarse equalization, and then at some time (e.g., 16 signalling intervals into the 2400 bps mode) to change to a smaller value of $a$ for fine tuning of the tap coefficients.

Figure 12:
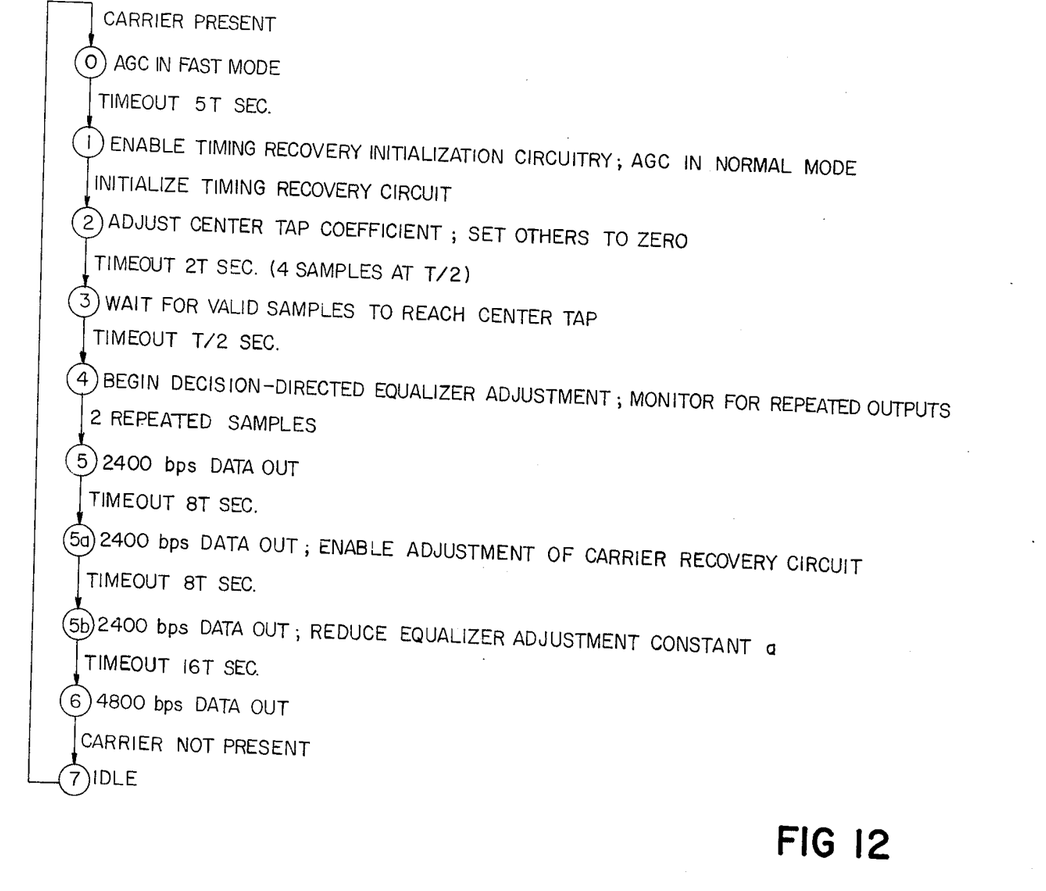
FIG. 12 is a diagram of the operation of a finite-state circuit governing set up and operation of the receiver of FIG. 6.

The training mode control circuit 81 controls the various receiver elements during the beginning of the burst as follows. It is most simply understood as a finite-state circuit whose operation is diagrammed in FIG. 12. The onset of the "carrier present" signal initializes the training mode control circuit to state 0, during which the AGC is put in fast mode. After a timeout of 5T seconds, the control circuit enters state 1, during which the AGC returns to normal mode, the equalizer tap coefficients are forced to zero, and the timing recovery initialization circuitry is enabled. When the peak detector 112 fires, the timing recovery circuit is initialized and the control circuit enters state 2, during which the principal equalizer tap coefficient is adjusted as shown in FIG. 11 while all other tap coefficients are held to zero. After a timeout of 2T seconds (4samples at the T/2 rate), the control circuit enters state 3 while it waits for valid samples to reach the center tap. (With the parameters described above, the first valid sample is already at tap 3 at the end of state 2 and since $M = 4$, state 3 can be skipped.) After a suitable timeout, the control circuit enters state 4, during which decision-directed equalizer tap adjustment begins and the decision-and-error circuit monitors the equalizer outputs looking for two repeated signal points. When this occurs, the descrambler is initialized and the control circuit enters state 5, during which the data clock is enabled at 2400 Hz and the decisions $d_k$ of the decision-and-error circuit 80 are converted by the decoder 86 and descrambler 87 into valid 2400 bps data out. After a timeout of 8T seconds, the carrier recovery adjustment circuitry is enabled, and after a further timeout of 8T seconds the equalizer adjustment constant $a$ is reduced. After a final timeout of 16T seconds, the control circuit causes the data clock to increase to 4800 Hz, the decision-and-error and decoder circuits to operate in 16-point (FIG. 5b) mode, and the decoder and descrambler to put out data at 4800 bps. At the end of transmission the received signal drops below the carrier detect circuit threshold and, after putting out all valid data, the receiver enters an idle state to await the beginning of the next burst.

Other embodiment are within the following claims.

What is claimed is:

1. In a receiver of the type adapted to receive bursts of signals sent at a predetermined rate of 1/T signals per second over a channel, wherein the receiver includes an automatic adaptive equalizer operative to facilitate accurate reception despite intersymbol interference when said signals each represent a predetermined number of data bits corresponding to a first selected high rate of data transmission, that improvement comprising circuitry for enabling said receiver to process during an early segment of a said burst of signals, each signal of said segment representing fewer than said predetermined number of data bits, corresponding to a second selected rate of data transmission lower than said first rate, at which second rate said receiver is capable of accurate reception without complete adaptation of said equalizer, circuitry for using signals in said segment to adapt said equalizer in a decision-directed mode, and circuitry or enabling said receiver to process said signals at said first rate of data transmission upon completion of said adaptation.

2. The improvement of claim 1 wherein said first rate is 4800 bps and said second rate is 2400 bps.

3. The improvement of claim 1 wherein said receiver includes decoding circuitry connected to receive signals from said equalizer and to decode said signals into output data, and data clock circuitry connected to said decoding circuitry to cause the latter to decode at said second rate prior to completion of the adaptation of said equalizer and at said first rate thereafter.

4. The improvement of claim 1 further comprising timing recovery circuitry for periodically sampling the signals received by said receiver and supplying said samples to said equalizer, and initialization circuitry for processing preamble signals in said burst prior to said early segment to initialize said timing recovery circuitry to enable accurate reception of said data signals in said segment without complete adaptation of said equalizer.

5. The improvement of claim 1 wherein said receiver includes initialization circuitry for processing preamble signals in said burst prior to said early segment to initialize said receiver to enable accurate reception of said data signals in said segment without complete adaptation of said equalizer, and circuitry for detecting the end of said preamble to initiate processing of said data signals at said second rate.

6. The improvement of claim 1 wherein said receiver is part of a central station in a multi-point transmission system having in addition a central transmitter and a number of remote transmitter/receiver stations.

7. The improvement of claim 1 in combination with a transmitter including circuitry for controlling transmitted signal power to avoid an abrupt power transition at the end of said early segment.

8. The improvement of claim 1 wherein said receiver includes timing recovery circuitry for causing said receiver to provide output signals at times $kT + \tau k = 0, 1\ldots$, where $\tau$ is a timing epoch, and initialization circuitry for processing preamble signals in said burst prior to said early segment and consisting of signal points alternating between two values, said initialization circuitry comprising circuitry for determining the magnitude of the difference between said received signals and said signals delayed by T seconds, and circuitry for setting the initial value of $\tau$ in accordance with the time at which said mganitude reaches a maximum.

9. The improvement of claim 8 wherein said receiver is of the type adapted to receive signals sent by a QAM transmitter and therefore includes circuitry for procesing complex signals each of which can be represented in the form $x(t) + iy(t)$, and said initialization circuitry comprises circuitry for forming the differences $x(t) - x(t-T)$ and $y(t) - y(t-T)$, circuitry for computing the sum of the absolute magnitudes of said differences, and circuitry for monitoring said sum and providing an initialization pulse when said sum reaches a maximum.

10. The improvement of claim 1 wherein said receiver is of the type adapted to receive signals sent by a QAM transmitter, and includes carrier recovery circuitry for setting the frequency and phase of demodulating carrier signals, said equalizer has complex tap coefficients and complex outputs and includes circuitry for processing complex preamble signals in said burst prior to said early segment and consisting of complex signal points alternating between two values whose average is non-zero, and initialization circuitry is provided for setting a single tap coefficient of said equalizer equal to a complex value whose phase is the difference between the phase of said average and the phase of the sum of the complex signal inputs to said equalizer at some time $t$ plus said inputs at time $t + T$, and for setting all other tap coefficients to zero, whereby the average phase of said outputs will equal the average phase of said two values without initial adjustment of the phase generated by said carrier recovery circuitry.

* * * * *

UNITED STATES PATENT AND TRADEMARK OFFICE
CERTIFICATE OF CORRECTION

PATENT NO. : 3,978,407
DATED : August 31, 1976
INVENTOR(S) : George D. Forney, Jr. and James C. Hart It is certified that error appears in the above-identified patent and that said Letters Patent are hereby corrected as shown below:

Col. 2, line 11, "equalizers" should be --equalizer--.

Col. 4, line 46, "3 2/1200" should be --32/1200--.

Col. 5, line 22, "definded" should be --defined--.

Col. 6, line 36, "$Z_k \bar{\phantom{j}}_j$" should be --$Z_{k-j}$--.

Col. 6, line 38, "$g_j^{k+1} = g_j^k - ae_k Z^*_{k-j},$" should be --$g_j^{k+1} = g_j^k - ae_k Z^*_{k-j},$--.

Col. 7, line 64, "$\approx$" should be --$\simeq$--.

Col. 8, line 5, "we" should be --w--.

Col. 8, line 7, "z" should be --Z--.

Col. 8, line 40, "$g_M^{k+1} = g_M^k - ae_k Z^*_{k-M}$" should be --$g_M^{k+1} = g_M^k - ae_k Z^*_{k-M}$--.

UNITED STATES PATENT AND TRADEMARK OFFICE
CERTIFICATE OF CORRECTION

PATENT NO. : 3,978,407
DATED : August 31, 1976
INVENTOR(S) : George D. Forney, Jr. and James C. Hart It is certified that error appears in the above-identified patent and that said Letters Patent are hereby corrected as shown below:

Col. 8, lines 47 and 48, the equation should read

--$g_M(2T) = -ac[Z^*(t) + Z^*(t+T/2) + Z^*(t+T) + Z^*(t+3T/2)] = -acw^*$--.

Col. 8, line 50, the equation should read --$g_M(2T) \simeq e^{-i\theta}$--.

Col. 9, line 6, "equalizer" should be --equalized--.

Col. 9, line 14, "knowns" should be --knows--.

Col. 9, line 49, a space should appear between "4" and "samples".

Col. 10, line 8, "embodiment" should be --embodiments--.

Col. 10, line 30, "or" should be --for--.

Col. 11, line 2, a comma should appear between "$\tau$" and "k".

Col. 11, line 12, "mganitude" should be --magnitude--.

UNITED STATES PATENT AND TRADEMARK OFFICE
CERTIFICATE OF CORRECTION

PATENT NO. : 3,978,407
DATED : August 31, 1976
INVENTOR(S) : George D. Forney, Jr. and James C. Hart It is certified that error appears in the above-identified patent and that said Letters Patent are hereby corrected as shown below:

The following should not have been printed in bold face type:

Col. 4, line 42, "i (illustrated in FIG.".

Col. 5, line 54, "$0 \leq j \leq N-1$".

Col. 6, line 21, the denominator of "T/2".

Col. 6, line 23, the denominator of "T/2".

Col. 6, line 25 "-1".

Col. 6, line 36, "$0 \leq j \leq N$".

Col. 7, line 2 "2T".

Col. 7, line 31, the denominator of "T/2".

Col. 8, line 11, "10e".

Col. 8, line 49, "-1".

Col. 8, line 61, "2T".

Signed and Sealed this sixteenth Day of August 1977

[SEAL]

Attest:

RUTH C. MASON
Attesting Officer

C. MARSHALL DANN
Commissioner of Patents and Trademarks